United States Patent
Aldana

(10) Patent No.: US 9,532,328 B2
(45) Date of Patent: Dec. 27, 2016

(54) METHODS AND APPARATUSES FOR IMPROVING QUALITY OF POSITIONING

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/278,942

(22) Filed: May 15, 2014

(65) Prior Publication Data

US 2015/0071093 A1    Mar. 12, 2015

Related U.S. Application Data

(60) Provisional application No. 61/875,558, filed on Sep. 9, 2013, provisional application No. 61/877,881, filed on Sep. 13, 2013.

(51) Int. Cl.

| | |
|---|---|
| *H04J 3/14* | (2006.01) |
| *H04L 12/26* | (2006.01) |
| *H04W 64/00* | (2009.01) |
| *H04W 24/08* | (2009.01) |
| *G01S 5/02* | (2010.01) |
| *G01S 5/14* | (2006.01) |

(52) U.S. Cl.
CPC .............. *H04W 64/00* (2013.01); *G01S 5/021* (2013.01); *G01S 5/14* (2013.01); *H04W 24/08* (2013.01)

(58) Field of Classification Search
USPC ....... 370/252, 334, 344; 375/148; 455/456.1
See application file for complete search history.

(56) References Cited

U.S. PATENT DOCUMENTS

| | | | |
|---|---|---|---|
| 7,480,234 B1 * | 1/2009 | Hart .................... | H04L 27/2662 370/208 |
| 8,233,457 B1 | 7/2012 | Chen et al. | |
| 8,335,283 B1 * | 12/2012 | Sun ........................ | H04L 7/042 375/316 |

(Continued)

OTHER PUBLICATIONS

Aldana C., et al., "802.11-2012 CID_46_47_48; 11-12-1249-04-000m-802-11-2012-cid-46-47-48", QUALCOMM, IEEE SA Mentor; 11-12-1249-04-000M-802-11-2012-CID-46-47-48, IEEE-SA Mentor, Piscataway, NJ USA, vol. 802.11m, No. 4, Jan. 17, 2013, pp. 1-17, XP068040038.

(Continued)

*Primary Examiner* — Edan Orgad
*Assistant Examiner* — Rebecca Song
(74) *Attorney, Agent, or Firm* — Silicon Valley Patent Group LLP

(57) ABSTRACT

Methods and apparatuses of improving quality of positioning are disclosed. According to aspects of the present disclosure, a transition from a short training field to a long training field in one or more communication messages between two wireless stations may be detected. A station may then determine a first arrival correction time based on the transition from the short training field and the long training field. With the first arrival correction time, more accurate timing of communications between the two wireless stations may be determined and used for improving quality of positioning applications.

26 Claims, 10 Drawing Sheets

(56) References Cited

U.S. PATENT DOCUMENTS

| | | | |
|---|---|---|---|
| 8,842,571 B1* | 9/2014 | Yu | H04L 25/26 370/252 |
| 2007/0121523 A1* | 5/2007 | Morandin | H04J 3/0682 370/252 |
| 2007/0230403 A1* | 10/2007 | Douglas | H04W 24/00 370/334 |
| 2009/0180522 A1* | 7/2009 | Sesia | H04B 1/7115 375/148 |
| 2009/0190565 A1* | 7/2009 | Wallace | H04L 7/042 370/345 |
| 2010/0239042 A1* | 9/2010 | Hamalainen | H04L 25/022 375/267 |
| 2010/0309932 A1* | 12/2010 | Diab | H04J 3/0682 370/503 |
| 2011/0090973 A1* | 4/2011 | Mishra | H04L 5/0025 375/260 |
| 2011/0130152 A1* | 6/2011 | Kim | G01S 5/14 455/456.1 |
| 2012/0106609 A1* | 5/2012 | Kim | H04L 25/0212 375/224 |
| 2012/0163367 A1* | 6/2012 | Choi | H04W 56/00 370/350 |
| 2012/0207231 A1* | 8/2012 | Zhang | H04L 27/2613 375/260 |
| 2012/0252520 A1* | 10/2012 | Xu | H03G 3/3047 455/522 |
| 2012/0269124 A1* | 10/2012 | Porat | H04W 72/1231 370/328 |
| 2012/0272198 A1 | 10/2012 | Baumgartner et al. | |
| 2013/0064124 A1* | 3/2013 | Sun | H04L 7/042 370/252 |
| 2013/0121173 A1* | 5/2013 | Chen | H04W 24/08 370/252 |
| 2013/0253867 A1* | 9/2013 | Chang | H04L 27/2666 702/76 |
| 2013/0271324 A1* | 10/2013 | Sendonaris | G01S 5/02 342/450 |
| 2013/0272198 A1* | 10/2013 | Azizi | H04W 72/02 370/328 |
| 2013/0286959 A1* | 10/2013 | Lou | H04W 72/04 370/329 |
| 2013/0343372 A1* | 12/2013 | Whinnett | 370/344 |
| 2014/0256352 A1* | 9/2014 | Kim | G01S 5/04 455/456.1 |
| 2015/0094086 A1* | 4/2015 | Hedley | G01S 5/0215 455/456.1 |

OTHER PUBLICATIONS

International Search Report and Written Opinion—PCT/US2014/050745—ISA/EPO—Feb. 3, 2015.

* cited by examiner

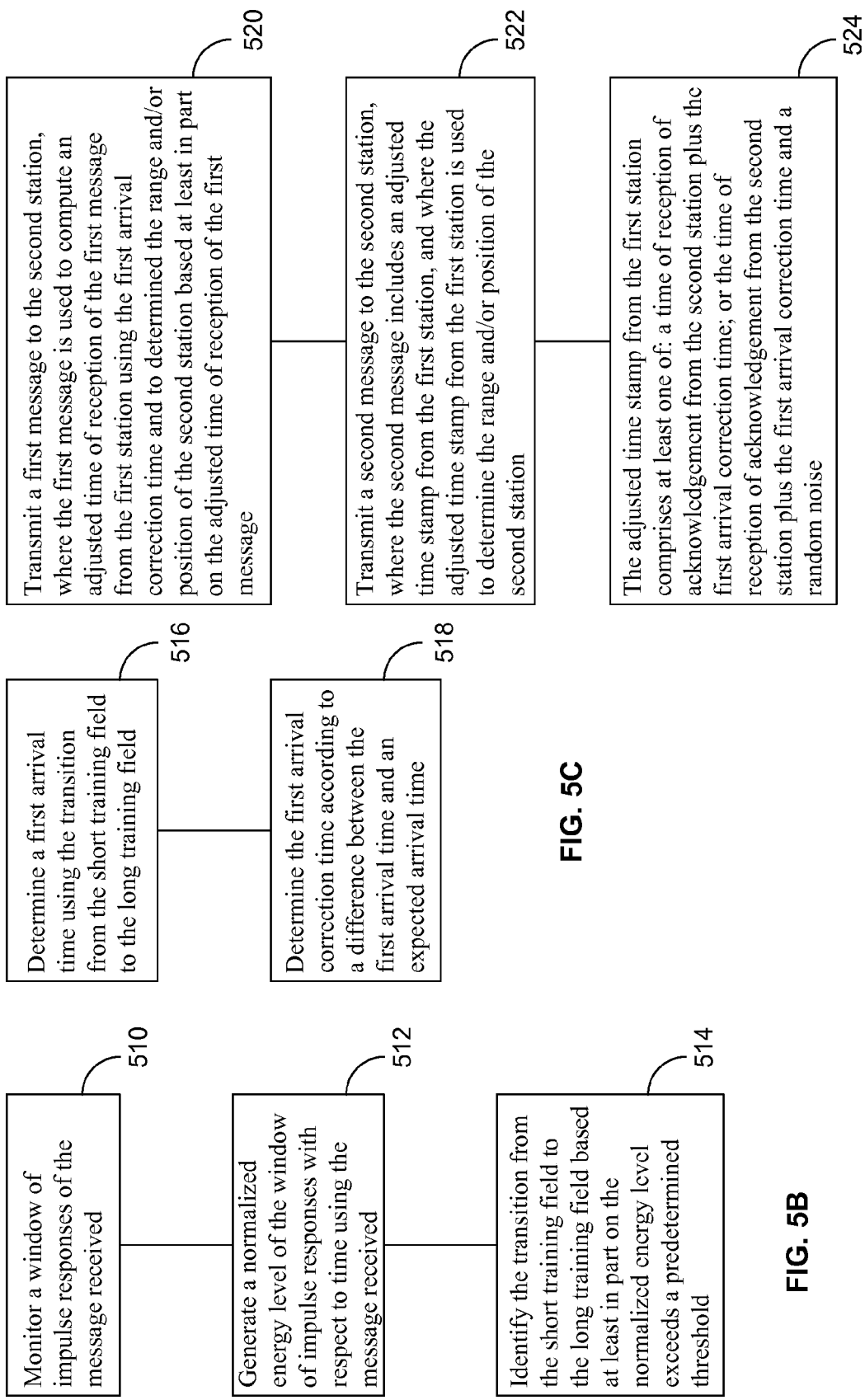

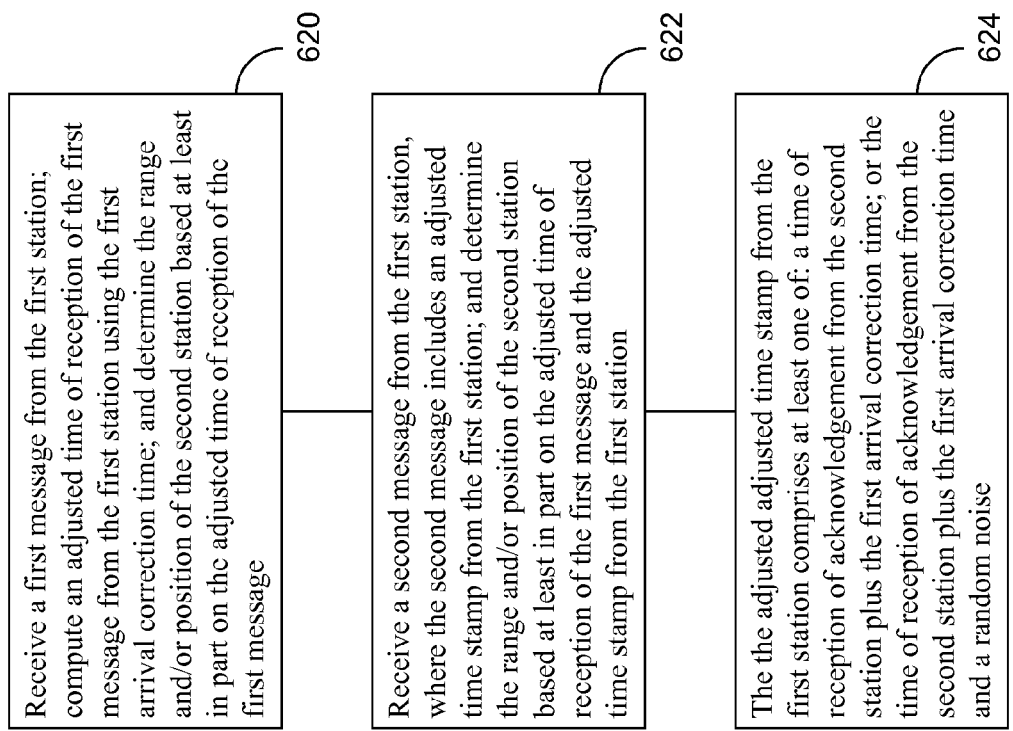
FIG. 6D
FIG. 6C
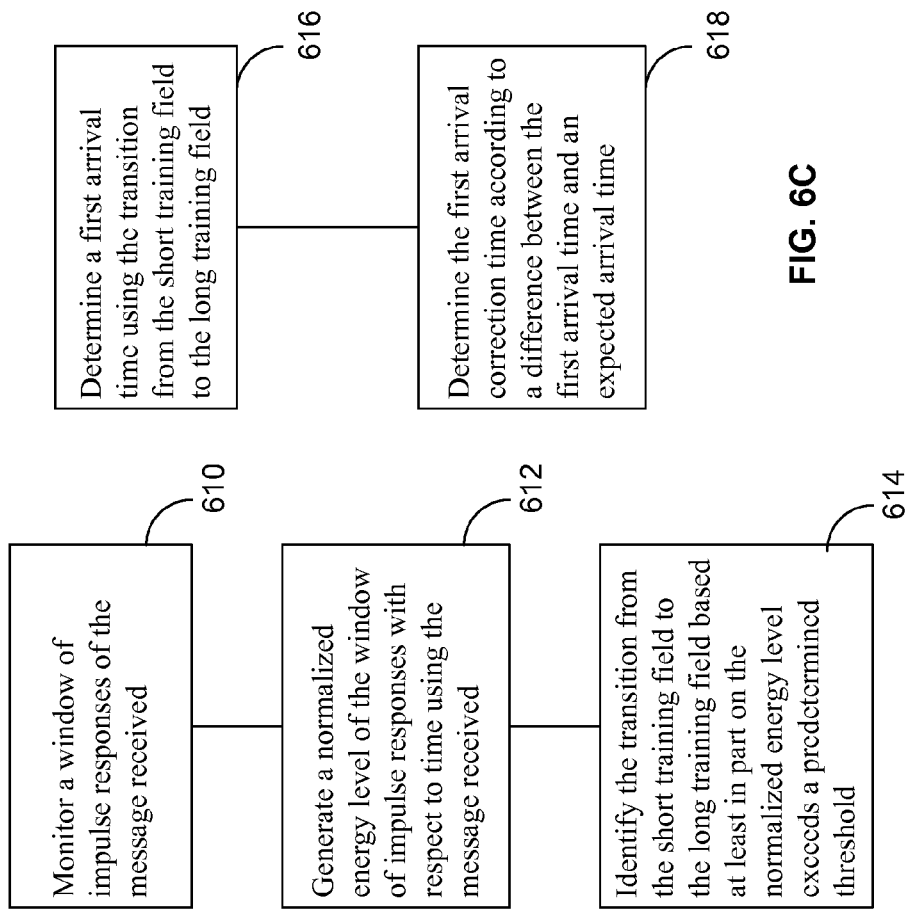
FIG. 6B

METHODS AND APPARATUSES FOR IMPROVING QUALITY OF POSITIONING

CROSS REFERENCE TO RELATED APPLICATIONS

This application claims the benefit of U.S. provisional application No. 61/875,558, "Methods and Apparatuses for Improving Quality of Positioning," filed Sep. 9, 2013, and U.S. provisional application No. 61/877,881, "Methods and Apparatuses for Improving Quality of Positioning," filed Sep. 13, 2013, both assigned to the assignee hereof. The aforementioned United States applications are hereby incorporated by reference in their entirety.

FIELD

The present disclosure relates to the field of wireless communications. In particular, the present disclosure relates to methods and apparatuses for improving quality of positioning.

BACKGROUND

In conventional positioning systems, using measurements of round-trip time (RTT) between two wireless terminals for positioning may produce inaccurate results. One of the reasons is that the guard interval in orthogonal frequency division multiplexing (OFDM) packets may typically introduce hundreds of nanoseconds of uncertainty into the measurements, which may in turn introduce hundreds of meters of inaccuracy in positioning.

SUMMARY

Methods and apparatuses for improving quality of positioning are disclosed. According to aspects of the present disclosure, a transition from a short training field to a long training field in a communication message between two stations may be detected. A station may then determine a first arrival correction time based on the transition from the short training field and the long training field. With the first arrival correction time, more accurate timing of communications between the two stations may be determined and used for improving quality of positioning applications.

In one embodiment, one or more processors or digital signal processors or combination thereof may be configured to receive a message at a first station, where the message comprises at least a short training field and a long training field received from a second station, detect a transition from the short training field to the long training field, determine a first arrival correction time based at least in part on the transition from the short training field to the long training field, and assist the second station to determine a range of the second station in accordance with the first arrival correction time.

To detect the transition from the short training field to the long training field, the one or more processors may be configured to monitor a window of impulse responses of the message received, generate a normalized energy level of the window of impulse responses with respect to time using the message received, and identify the transition from the short training field to the long training field based at least in part on the normalized energy level exceeds a predetermined threshold. The predetermined threshold may represent a fraction of the normalized energy level of the window of impulse responses. In other implementations, a change of the slope of the normalized energy level of the impulse responses may be used to identify a transition from the short training field to the long training field. For example, if the change of the slope of the normalized energy level of the impulse responses exceeds a predetermined threshold, a transition from the short training field to the long training field may be identified.

To determine the first arrival correction time, the one or more processors may be configured to determine a first arrival time using the transition from the short training field to the long training field, and determine the first arrival correction time according to a difference between the first arrival time and an expected arrival time.

To assist the second station to determine the range of the second station in accordance with the first arrival correction time, the one or more processors may be configured to transmit a first message to the second station, where the first message is used to compute an adjusted time of reception of the first message from the first station using the first arrival correction time and to determine the range of the second station based at least in part on the adjusted time of reception of the first message. The one or more processors may be configured to transmit a second message to the second station, where the second message includes an adjusted time stamp from the first station, and where the adjusted time stamp from the first station is used to determine the range of the second station.

Note that the adjusted time stamp from the first station may include a time of reception of acknowledgement from the second station plus the first arrival correction time. The adjusted time stamp from the first station may also include a time of reception of acknowledgement from the second station plus the first arrival correction time and a random noise.

In another embodiment, a computer program product may include a non-transitory medium that stores instructions for execution by one or more computer systems. The instructions may include instructions for receiving a message at a first station, where the message comprises at least a short training field and a long training field received from a second station, instructions for detecting a transition from the short training field to the long training field, instructions for determining a first arrival correction time based at least in part on the transition from the short training field to the long training field, and instructions for assisting the second station to determine a range of the second station in accordance with the first arrival correction time.

In yet another embodiment, a device may include a transceiver configured to receive a message at the device, where the message comprises at least a short training field and a long training field received from a second station, a control module including control logic and one or more processors. The one or more processors or digital signal processors or combination thereof may further include logic configured to detect a transition from the short training field to the long training field, determine a first arrival correction time based at least in part on the transition from the short training field to the long training field, and assist the second station to determine a range of the second station in accordance with the first arrival correction time.

In yet another embodiment, an apparatus may include means for receiving a message at the apparatus, where the message comprises at least a short training field and a long training field received from a second station, means for detecting a transition from the short training field to the long training field, means for determining a first arrival correction time based at least in part on the transition from the short training field to the long training field, and means for assisting the second station to determine a range of the second station in accordance with the first arrival correction time.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 5B illustrates an exemplary implementation for detecting a transition from a short training field to a long training field of FIG. 5A according to aspects of the present disclosure.

FIG. 5C illustrates an exemplary implementation for determining a first arrival correction time of FIG. 5A according to aspects of the present disclosure.

FIG. 5D illustrates an exemplary implementation for assisting the second station to determine a position of FIG. 5A according to aspects of the present disclosure.

FIG. 6B illustrates an exemplary implementation for detecting a transition from a short training field to a long training field of FIG. 6A according to aspects of the present disclosure.

FIG. 6C illustrates an exemplary implementation for determining a first arrival correction time of FIG. 6A according to aspects of the present disclosure.

FIG. 6D illustrates an exemplary implementation for determining a range of the second station of FIG. 6A according to aspects of the present disclosure.

DESCRIPTION OF EMBODIMENTS

Embodiments of improving quality of positioning are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point or femto cell). Particular message flows and fields in messages frames may enable obtaining RTT measurements in sufficient accuracy for measuring a range between the wireless STAs using fewer messages, for example. Such a measured range may be used in any one of several applications including positioning operations, for example.

Figure 1:
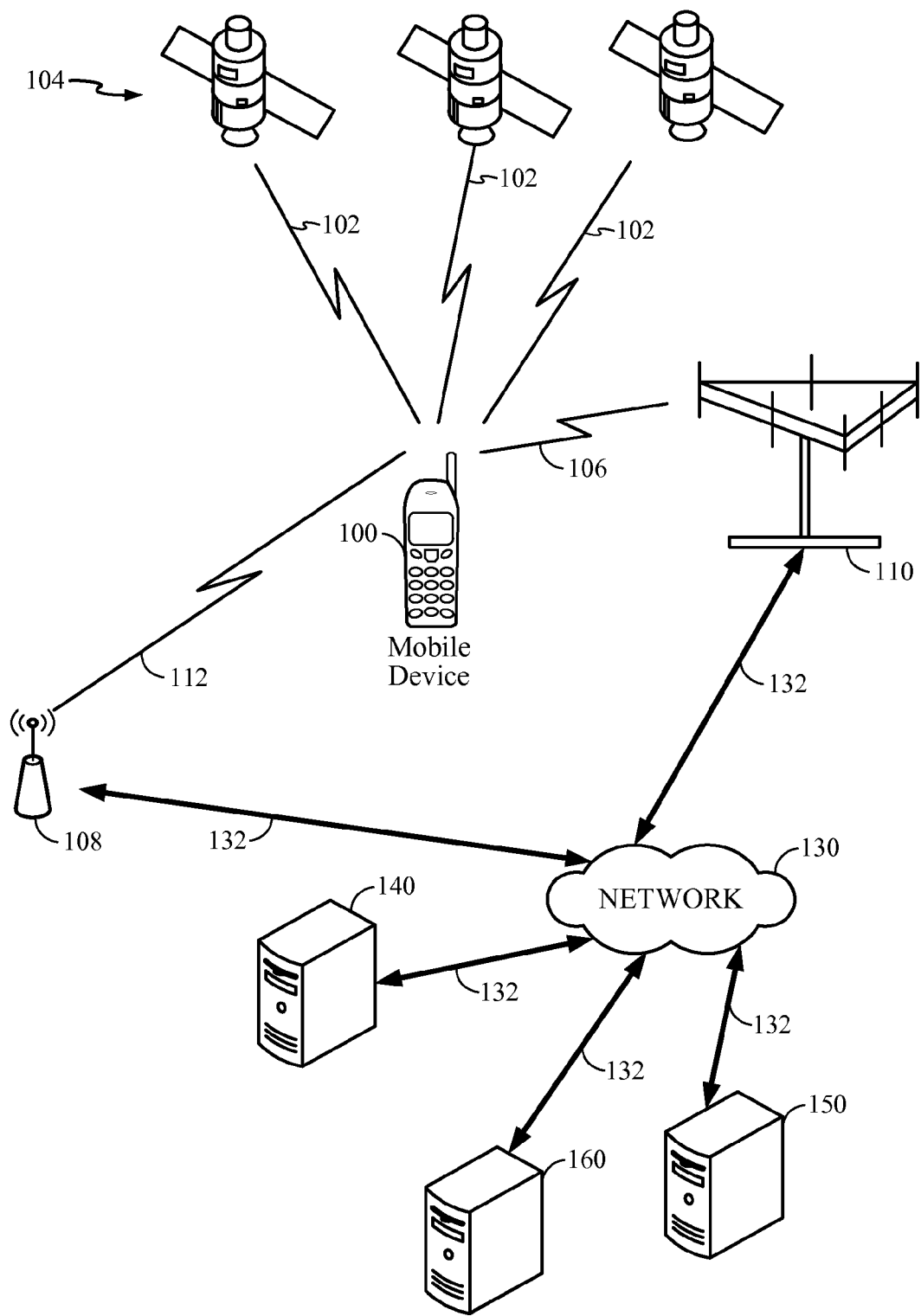
FIG. 1 illustrates an exemplary system environment according to aspects of the present disclosure.

FIG. 1 illustrates an exemplary system environment according to aspects of the present disclosure. As shown in FIG. 1, a mobile device 100 may receive or acquire satellite positioning system (SPS) signals 102 from SPS satellites 104. In some embodiments, SPS satellites 104 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS) such as, for example, Wide Area Augmentation System (WAAS), European Geostationary Navigation Overlay Service (EGNOS), Quasi-Zenith Satellite System (QZSS), etc.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 106. Similarly, mobile device 100 may transmit wireless signals to, or receive wireless signals from local transceiver 108 over wireless communication link 112.

In a particular implementation, local transceiver 108 may be configured to communicate with mobile device 100 at a shorter range over wireless communication link 112 than at a range enabled by base station transceiver 110 over wireless communication link 106. For example, local transceiver 108 may be positioned in an indoor environment. Local transceiver 108 may provide access to a wireless local area network (WLAN, e.g., IEEE Std. 802.11 network) or wireless personal area network (WPAN, e.g., Bluetooth® network). In another example implementation, local transceiver 108 may comprise a femto cell transceiver capable of facilitating communication on wireless communication link 112 according to a cellular communication protocol.

In a particular implementation, base station transceiver 110 and local transceiver 108 may communicate with one or more servers 140, 150 and/or 160 over a network 130 through links 132. Here, network 130 may comprise any combination of wired or wireless communication networks. In a particular implementation, network 130 may comprise Internet Protocol (IP) infrastructure capable of facilitating communication between mobile device 100 and servers 140, 150 or 160 through local transceiver 108 or base station transceiver 110. In another implementation, network 130 may comprise cellular communication network infrastructure such as, for example, a base station controller or master switching center (not shown) to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 104. Here, mobile device 100 may compute such pseudorange measurements based, at least in part, on pseudo-noise code phase detections in signals 102 acquired from four or more SPS satellites 104. In particular implementations, mobile device 100 may receive from server 140, 150 or 160 positioning assistance data to aid in the acquisition of signals 102 transmitted by SPS satellites 104 including, for example, almanac, ephemeris data, Doppler search windows, etc.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 160 may be capable of providing positioning assistance data to mobile device 100 including, for example, locations and identities of terrestrial transmitters to facilitate positioning techniques such as AFLT and OTDOA. For example, servers 140, 150 or 160 may include a base station almanac (BSA) which indicates locations and identities of cellular base stations in a particular region or regions.

In particular environments such as indoor environments or urban canyons, mobile device 100 may not be capable of acquiring signals 102 from a sufficient number of SPS satellites 104 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter); expected RSSI from signals transmitted by the identified local transmitters, an expected RTT from the identified transmitters, and possibly standard deviations from these expected RSSI or RTT.

In particular implementations, mobile device 100 may receive positioning assistance data for indoor positioning operations from servers 140, 150 or 160. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, route-ability graphs, etc. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a route-ability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 160 by, for example, requesting the indoor assistance data through selection of a universal resource locator (URL). In particular implementations, servers 140, 150 or 160 may be capable of providing indoor navigation assistance data to cover many different indoor areas including, for example, floors of buildings, wings of hospitals, terminals at an airport, portions of a university campus, areas of a large shopping mall, etc. Also, memory resources at mobile device 100 and data transmission resources may make receipt of indoor navigation assistance data for areas served by servers 140, 150 or 160 impractical or infeasible; a request for indoor navigation assistance data from mobile device 100 may indicate a rough or coarse estimate of a location of mobile device 100. Mobile device 100 may then be provided indoor navigation assistance data covering areas including and/or proximate to the rough or coarse estimate of the location of mobile device 100.

In a particular implementation, particular messages flows between wireless STAs may be implemented for obtaining a measurement of RTT between the STAs for use in positioning operations as discussed above. In particular implementations, as described below, any STA may comprise a mobile device (e.g., mobile device 100) or a stationary transceiver (such as access point, stationary Bluetooth® device, local transceiver 108, etc.). As such, an exchange of messages between wireless STAs may comprise an exchange of messages between a mobile device and a stationary transceiver, between two peer mobile devices, or between two stationary transceivers, for example.

Figure 2:
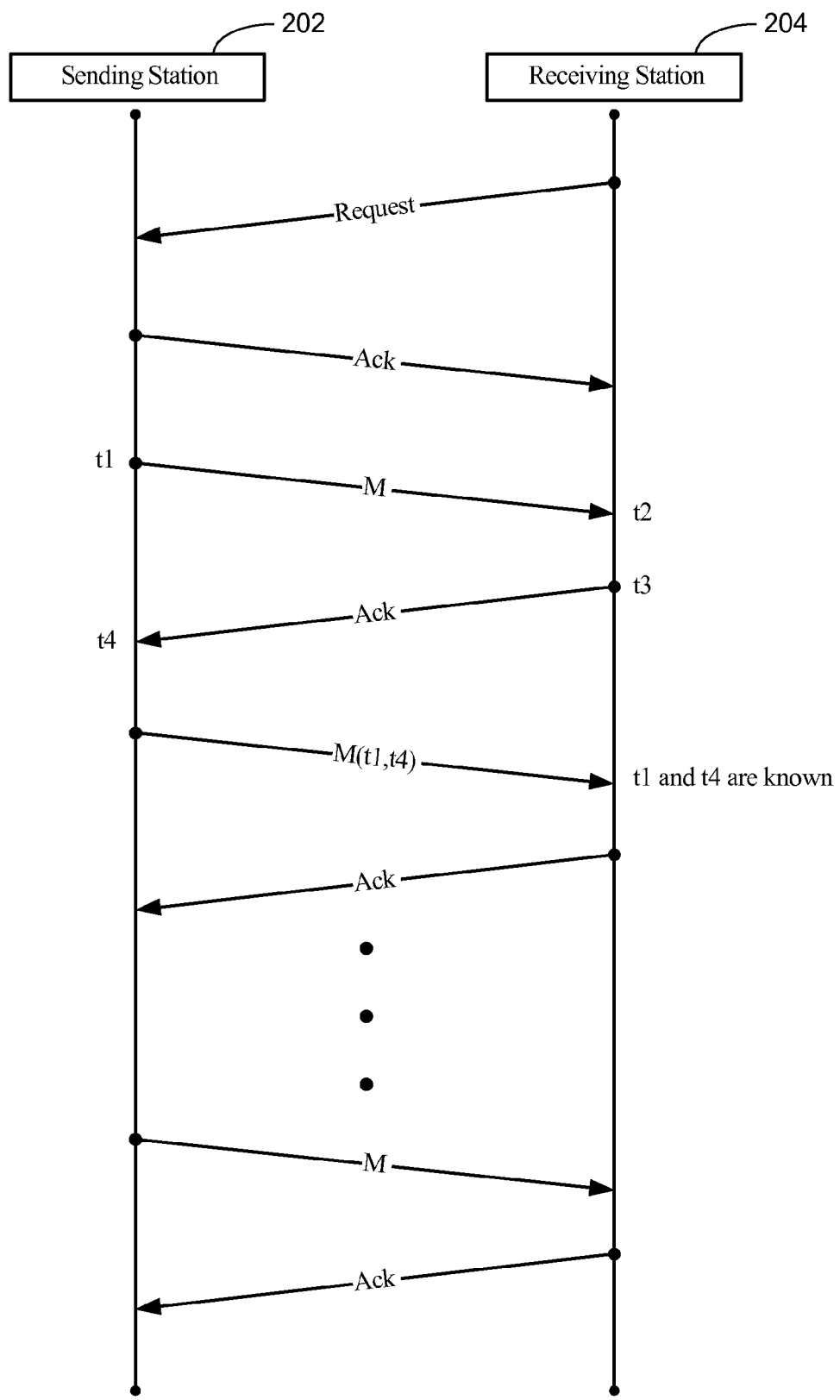
FIG. 2 illustrates exemplary messages flow between wireless stations (STAs) according to aspects of the present disclosure.

FIG. 2 illustrates exemplary messages flow between wireless stations (STAs) according to aspects of the present disclosure. In this example, messages flow between wireless stations STAs including a sending station 202 and a receiving station 204 are shown. In this context, the sending STA 202 or the receiving STA 204 may comprise any one of several transceiver devices including a mobile device (e.g., mobile device 100) or stationary access transceiver device (e.g., local transceiver 108), or stationary base station (e.g., 110). A receiving STA may obtain or compute one or more measurements of RTT based, at least in part, on timing of messages or frames transmitted between the receiving STA and a sending STA. In one exemplary embodiment, sending STA 202 may be mobile device 100 and receiving STA 204 may be local transceiver 108 of FIG. 1. In another exemplary embodiment, sending STA 202 may be mobile device 100 and receiving STA 204 may be stationary base station 110 of FIG. 1. In yet another exemplary embodiment, sending STA 202 may be another mobile device (not shown) and receiving STA 204 may be mobile device 100 of FIG. 1.

According to aspects of the present disclosure, the receiving STA may transmit a timing measurement request message or frame ("Request") to the sending STA and receive an acknowledgement message or frame ("Acknowledgement") transmitted in response. According to aspects of the present disclosure, the request message may include at least a short training field, a long training field, and a transition from the short training field to the long training field. Similarly, the acknowledgement message may also include at least a short training field, a long training field, and a transition from the short training field to the long training field. The receiving STA may then obtain or compute an RTT measurement based, at least in part, on time stamp values (t1, t4) provided in timing measurement messages or frames ("M") received from the sending STA. In one example implementation, a receiving STA may compute an RTT measurement as (t4−t1)−(t3−t2), where t2 and t3 are the time of receipt of a previous timing measurement message or frame and transmission of preceding acknowledgement message or frame, respectively. The receiving STA may transmit a series of timing measurement request messages in a burst to obtain a corresponding number of RTT measurements which may be combined for removal of measurement noise in computing a range between the receiving and sending STAs.

Figure 3A:
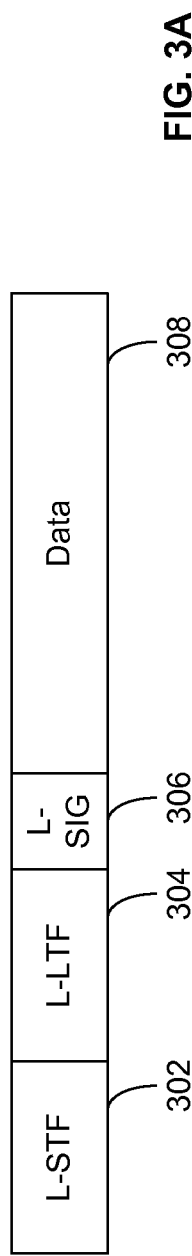
FIG. 3A illustrates an exemplary message according to aspects of the present disclosure.

FIG. 3A illustrates an exemplary message according to aspects of the present disclosure. The message includes packets L-SFT 302, L-LTF 304, L-SIG 306 and data 308. L-STF 302 represents short training field for a legacy or non-high-throughput (non-HT) device. L-LTF 304 represents long training field for a legacy or non-HT device. L-SIG 306 represents signal field for a legacy or non-HT device. Exemplary time durations of L-SFT 302, L-LTF 304, and L-SIG 306 may be approximately 8 microseconds (us), 8 us, and 4 us, respectively. In other implementations, L-SFT 302, L-LTF 304, L-SIG 306 may have different time durations. In this example, the transition between a short training field and a long training field would occur between the packets 302 and 304.

Figure 3B:
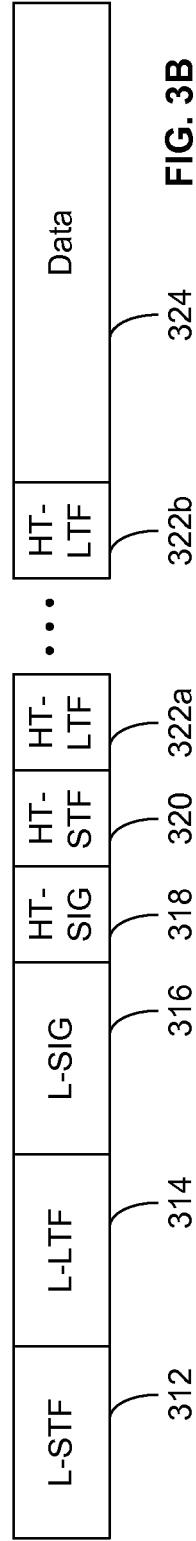
FIG. 3B illustrates another exemplary message according to aspects of the present disclosure.

FIG. 3B illustrates another exemplary message according to aspects of the present disclosure. In the example shown in FIG. 3B, the message includes packets for both legacy devices as well as for high-throughput (HT) devices. Similar to the example of FIG. 3A, the message includes packets L-SFT 312, L-LTF 314, L-SIG 366. In addition, the message includes packets HT-SIG 318, HT-STF 320, HT-LTF 322a, HT-LTF 322b, and data 324. HT-STF 320 represents short training field for a HT device having duration of approximately 4 microseconds. HT-LTF 322a or 322b represents long training field for a HT device having duration of approximately 4 microseconds. HT-SIG 318 represents signal field for a HT device having duration of approximately 4 microseconds. Exemplary time durations of HT-STF 320, HT-LTF 322a, HT-LTF 322b and HT-SIG 318 may be approximately 4 microseconds. In other implementations, HT-STF 320, HT-LTF 322a, HT-LTF 322b and HT-SIG 318 may have different time durations. In this example, the transition between L-STF and L-LTF would occur between the packets 312 and 314; and the transition between HT-STF and HT-LTF would occur between the packets 320 and 322a.

Figure 3C:
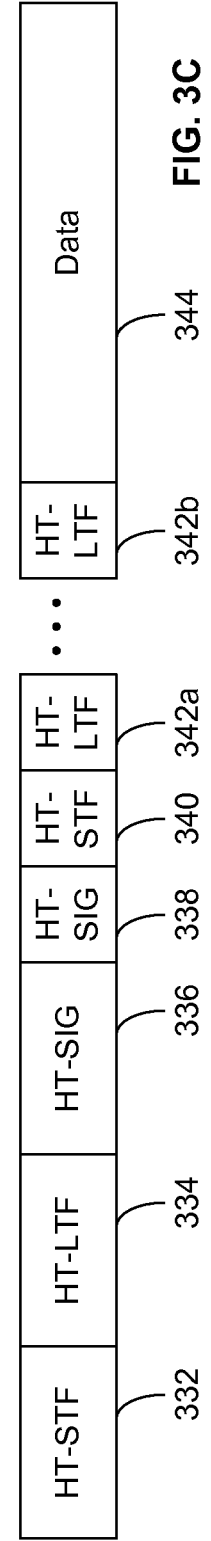
FIG. 3C illustrates yet another exemplary message according to aspects of the present disclosure.

FIG. 3C illustrates yet another exemplary message according to aspects of the present disclosure. In this example, the message includes packets for high throughput devices. Similar to the example shown in FIG. 3B, the message includes packets HT-STF 332, HT-LTF 334, HT-SIG 336, HT-SIG 338, HT-STF 340, HT-LTF 342a, HT-LTF 342b, and data 344. In this example, the transition between HT-STF and HT-LTF would occur between the packets 332 and 334, as well as between packets 340 and 342a.

Figure 4A:
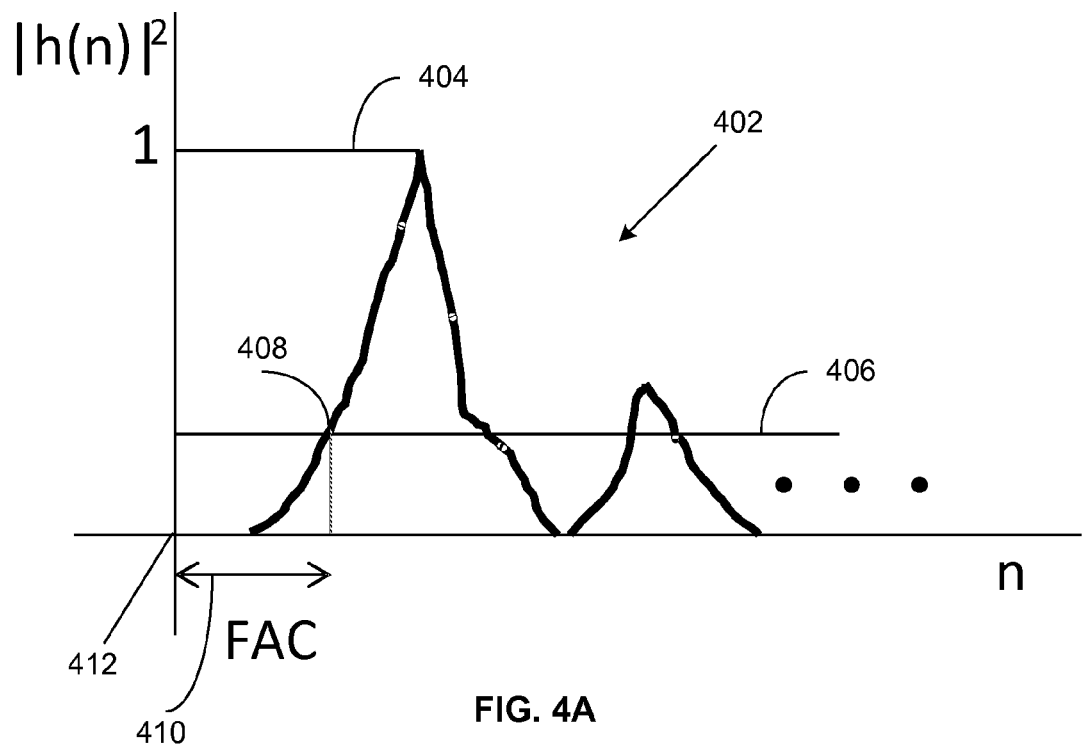
FIG. 4A illustrates an exemplary implementation for measuring first arrival correction time according to aspects of the present disclosure.

FIG. 4A illustrates an exemplary implementation for measuring first arrival correction time according to aspects of the present disclosure. As shown in FIG. 4A, the horizontal axis represents time (shown as "n") and the vertical axis represent a normalized energy level (shown as "$|h(n)|^2$") of a window of impulse response of a message received between the sending station 202 and the receiving station 204 of FIG. 2. Referring to FIG. 2, the message can be, but not limited to: 1) the request sent from station 204 to station 202; 2) the acknowledgement send from station 202 to station 204; 3) the message sent from station 202 to station 204 at time t1, which may be received at station 204 at time t2; 4) the ACK sent from station 204 to station 202 at time t3 which may be received at station 202 at time t4; 5) the message that includes t1 and t4 sent from station 202 to station 204; or 6) other acknowledgements or messages sent between the two stations.

According to aspects of the present disclosure, a station may be configured to monitor a window of impulse responses of the message received. Then, the station may be configured to generate a normalized energy level of the window of impulse responses with respect to time using the message received, which may be represented by graph 402 as shown in FIG. 4A. The maximum of the normalized energy level of the window of impulse responses may be represented as 1 (shown as numeral 404). The transition from the short training field to the long training field may be identified based on the normalized energy level exceeds a predetermined threshold 406, approximately at point 408. Note that the predetermined threshold can be represented as a fraction of the normalized energy level of the window of impulse responses. In some implementations, the level of threshold may be set to 1/16, 1/8, or 1/4 of the maximum normalized energy of the channel.

In other implementations, a change of the slope of the normalized energy level of the impulse responses may be used to identify a transition from the short training field to the long training field. In the example shown in FIG. 4A, the window of impulse responses prior to the point 412 may be relatively flat. After the point 412, a change in slope of the impulse responses may be observed. If the change of the slope of the normalized energy level of the impulse responses exceeds a predetermined threshold, such as greater than 45 degrees, a transition from the short training field to the long training field may be identified. In some other implementations, the predetermined threshold for the slope of the impulse response may be set to different values, such as 30 degrees, 50 degrees, 60 degrees, or other values.

The first arrival correction (FAC) time 410 may be determined by computing a difference between the first arrival time, indicated by point 408 in this example, and an expected arrival time, represented by the origin 412 of graph 402. Note that in the example of FIG. 4A, the time of transition from STF to LTF is shown as being late with respect to the expected arrival time 412.

Figure 4B:
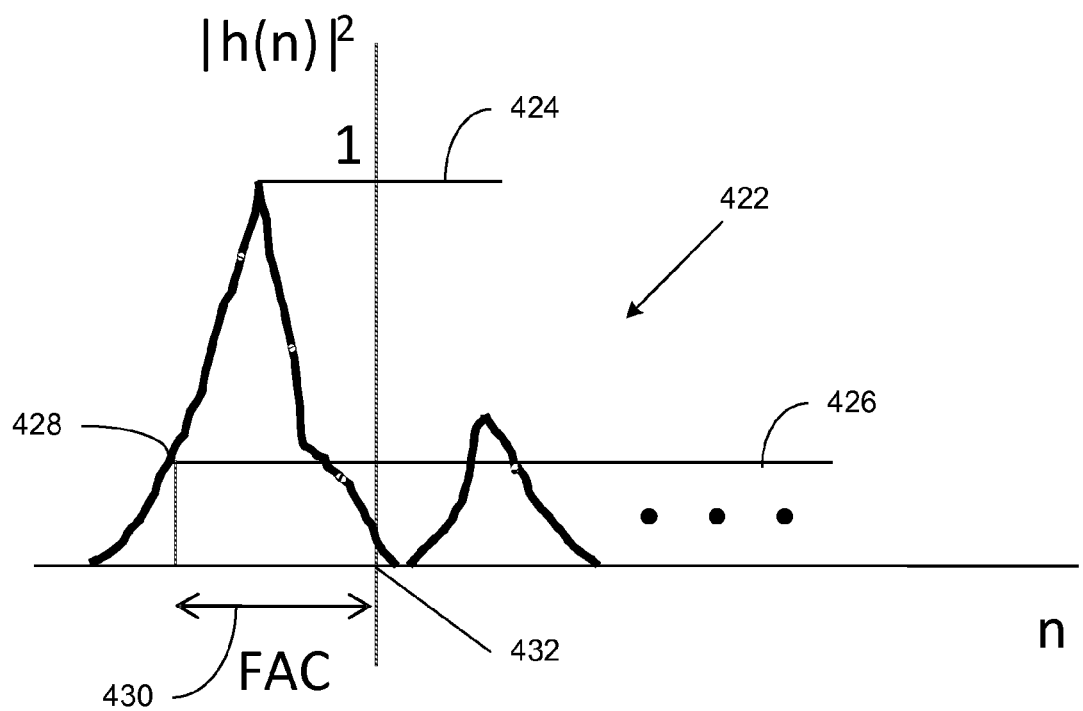
FIG. 4B illustrates another exemplary implementation for measuring first arrival correction time according to aspects of the present disclosure.

FIG. 4B illustrates another exemplary implementation for measuring first arrival correction time according to aspects of the present disclosure. In this example, the time of transition from STF to LTF is shown as being early with respect to the expected arrival time. Similar to the example shown in FIG. 4A, a station (such as 202 or 204) may be configured to monitor a window of impulse responses of a message received. Then, the station may be configured to generate a normalized energy level of the window of impulse responses with respect to time using the message received, which may be represented by graph 422 as shown in FIG. 4B. The maximum of the normalized energy level of the window of impulse responses may be represented as 1 (shown as numeral 424). The transition from the short training field to the long training field may be identified based on the normalized energy level exceeds a predetermined threshold 426, approximately at point 428. The first arrival correction (FAC) time 430 may be determined by computing a difference between the first arrival time, indicated by point 428 in this example, and an expected arrival time, represented by the origin 432 of graph 422.

Figure 5A:
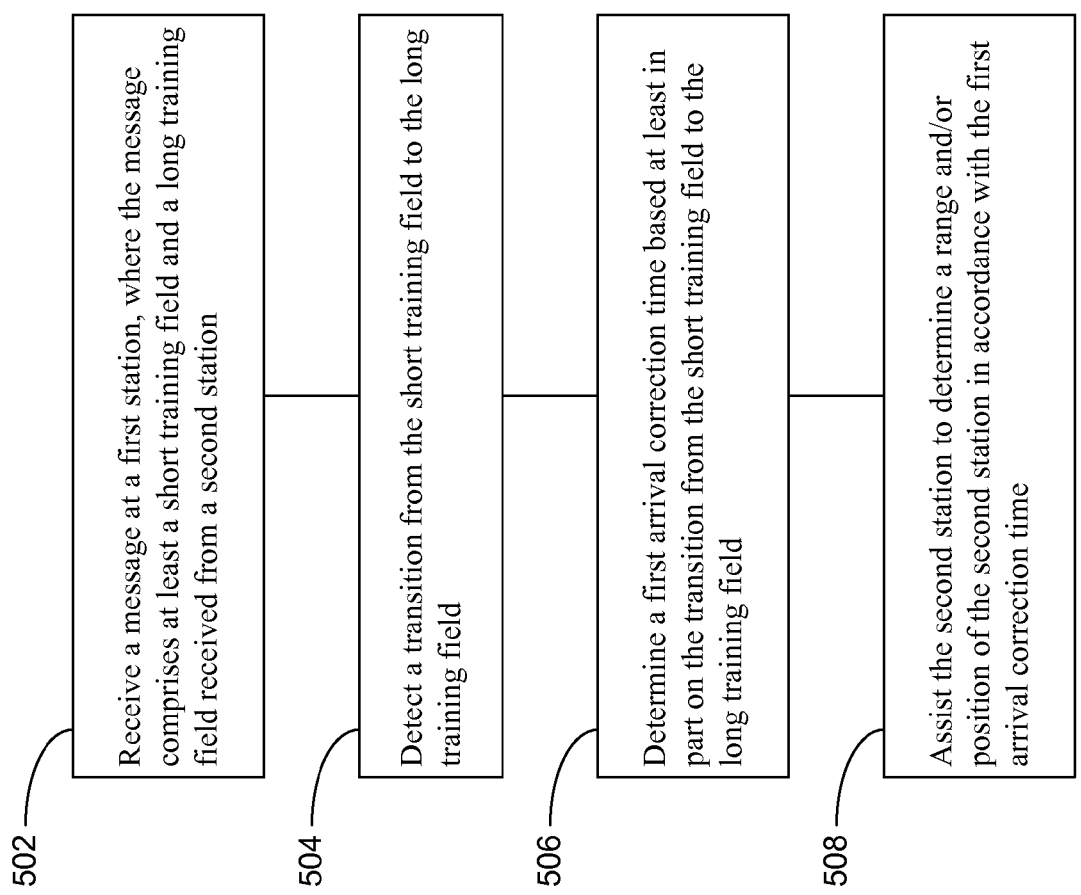
FIG. 5A illustrates an exemplary flow chart for implementing methods of improving quality of positioning according to aspects of the present disclosure.

FIG. 5A illustrates an exemplary flow chart for implementing methods of improving quality of positioning according to aspects of the present disclosure. In the exemplary implementation shown in FIG. 5A, in block 502, the method receives a message at a first station, where the message comprises at least a short training field and a long training field received from a second station. In block 504, the method detects a transition from the short training field to the long training field. In block 506, the method determines a first arrival correction time based at least in part on the transition from the short training field to the long training field. In block 508, the method assists the second station to determine a range and/or position of the second station in accordance with the first arrival correction time.

FIG. 5B illustrates an exemplary implementation for detecting a transition from a short training field to a long training field of FIG. 5A according to aspects of the present disclosure. As shown in FIG. 5B, in block 510, the method monitors a window of impulse responses of the message received. In block 512, the method generates a normalized energy level of the window of impulse responses with respect to time using the message received. In block 514, the method identifies the transition from the short training field to the long training field based at least in part on the normalized energy level exceeds a predetermined threshold.

According to aspects of the present disclosure, the predetermined threshold represents a fraction of the normalized energy level of the window of impulse responses.

FIG. 5C illustrates an exemplary implementation for determining a first arrival correction time of FIG. 5A according to aspects of the present disclosure. In this example, in block 516, the method determines a first arrival time using the transition from the short training field to the long training field. In block 518, the method the first arrival correction time according to a difference between the first arrival time and an expected arrival time.

FIG. 5D illustrates an exemplary implementation for assisting the second station to determine a position of FIG. 5A according to aspects of the present disclosure. As shown in FIG. 5D, in block 520, the method transmits a first message to the second station, where the first message is used to compute an adjusted time of reception of the first message from the first station using the first arrival correction time and to determine the range and/or position of the second station based at least in part on the adjusted time of reception of the first message.

In block 522, the method transmits a second message to the second station, where the second message includes an adjusted time stamp from the first station, and where the adjusted time stamp from the first station is used to determine the range and/or position of the second station.

In block 524, the adjusted time stamp from the first station comprises at least one of: a time of reception of acknowledgement from the second station plus the first arrival correction time, or the time of reception of acknowledgement from the second station plus the first arrival correction time and a random noise.

Figure 6A:
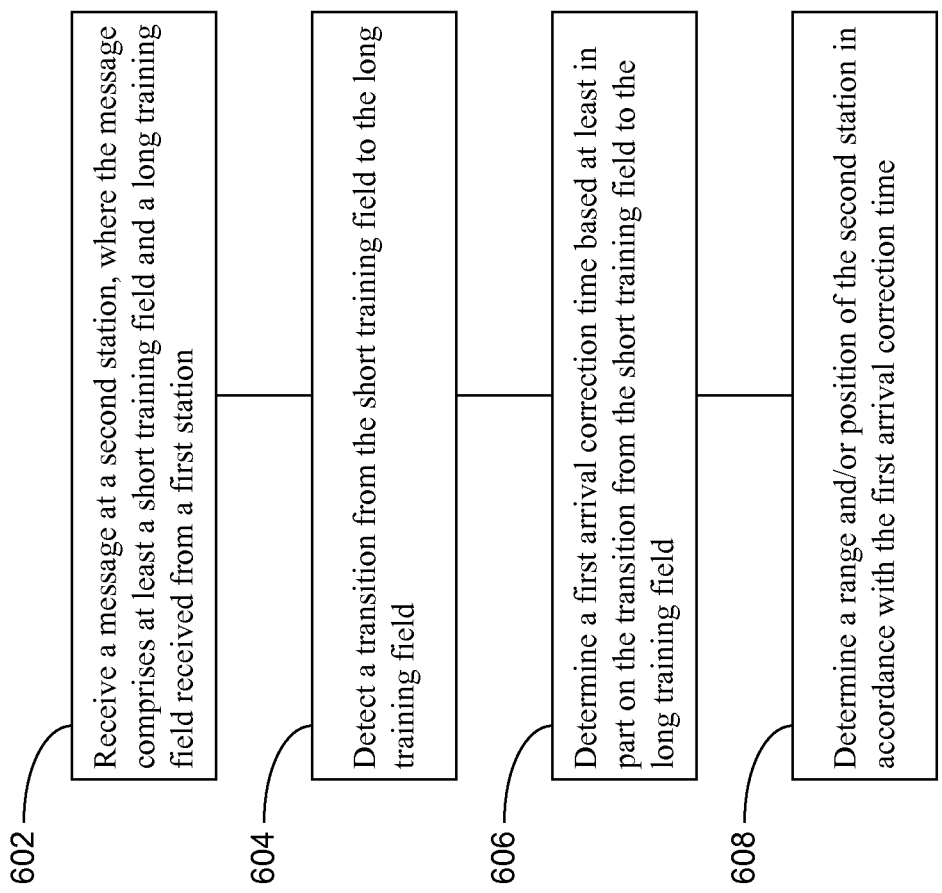
FIG. 6A illustrates another exemplary flow chart for implementing methods of improving quality of positioning according to aspects of the present disclosure.

FIG. 6A illustrates another exemplary flow chart for implementing methods of improving quality of positioning according to aspects of the present disclosure. In the exemplary implementation shown in FIG. 6A, in block 602, the method receives a message at a second station, where the message comprises at least a short training field and a long training field received from a first station. In block 604, the method detects a transition from the short training field to the long training field. In block 606, the method determines a first arrival correction time based at least in part on the transition from the short training field to the long training field. In block 608, the method determines a range and/or position of the second station in accordance with the first arrival correction time.

FIG. 6B illustrates an exemplary implementation for detecting a transition from a short training field to a long training field of FIG. 6A according to aspects of the present disclosure. As shown in FIG. 6B, in block 610, the method monitors a window of impulse responses of the message received. In block 612, the method generates a normalized energy level of the window of impulse responses with respect to time using the message received. In block 614, the method identifies the transition from the short training field to the long training field based at least in part on the normalized energy level exceeds a predetermined threshold.

FIG. 6C illustrates an exemplary implementation for determining a first arrival correction time of FIG. 6A according to aspects of the present disclosure. In the exemplary implementation shown in FIG. 6C, in block 616, the method determines a first arrival time using the transition from the short training field to the long training field. In block 618, the method determines the first arrival correction time according to a difference between the first arrival time and an expected arrival time.

FIG. 6D illustrates an exemplary implementation for determining a range of the second station of FIG. 6A according to aspects of the present disclosure. As shown in FIG. 6D, in block 620, the method receives a first message from the first station; computes an adjusted time of reception of the first message from the first station using the first arrival correction time; and determines the range and/or position of the second station based at least in part on the adjusted time of reception of the first message.

In block 622, the method receives a second message from the first station, where the second message includes an adjusted time stamp from the first station; and determines the range and/or position of the second station based at least in part on the adjusted time of reception of the first message and the adjusted time stamp from the first station.

In block 624, the adjusted time stamp from the first station comprises at least one of: a time of reception of acknowledgement from the second station plus the first arrival correction time; or the time of reception of acknowledgement from the second station plus the first arrival correction time and a random noise.

According to aspects of the present disclosure, in one embodiment, one or more processors may be configured to receive a message at a second station, where the message comprises at least a short training field and a long training field received from a first station, detect a transition from the short training field to the long training field, determine a first arrival correction time based at least in part on the transition from the short training field to the long training field, and determine a range and/or position of the second station in accordance with the first arrival correction time.

To detect the transition from the short training field to the long training field, the one or more processors may be configured to monitor a window of impulse responses of the message received, generate a normalized energy level of the window of impulse responses with respect to time using the message received, and identify the transition from the short training field to the long training field based at least in part on the normalized energy level exceeds a predetermined threshold. The predetermined threshold may represent a fraction of the normalized energy level of the window of impulse responses.

To determine the first arrival correction time, the one or more processors may be configured to determine a first arrival time using the transition from the short training field to the long training field, and determine the first arrival correction time according to a difference between the first arrival time and an expected arrival time.

To determine the range and/or position of the second station in accordance with the first arrival correction time, the one or more processors may be configured to receive a first message from the first station, compute an adjusted time of reception of the first message from the first station using the first arrival correction time, and determine the range and/or position of the second station based at least in part on the adjusted time of reception of the first message. The one or more processors may be further configured to receive a second message from the first station, where the second message includes an adjusted time stamp from the first station, and determine the range and/or position of the second station based at least in part on the adjusted time of reception of the first message and the adjusted time stamp from the first station.

Note that the adjusted time stamp from the first station may include a time of reception of acknowledgement from the second station plus the first arrival correction time. The adjusted time stamp from the first station may further include a time of reception of acknowledgement from the second station plus the first arrival correction time and a random noise.

In another embodiment, a computer program product may include non-transitory medium storing instructions for execution by one or more computer systems. The instructions may further include instructions for receiving a message at a second station, where the message comprises at least a short training field and a long training field received from a first station, instructions for detecting a transition from the short training field to the long training field, instructions for determining a first arrival correction time based at least in part on the transition from the short training field to the long training field, and instructions for determining a range and/or position of the second station in accordance with the first arrival correction time.

In yet another embodiment, a device may include a transceiver configured to receive a message at the device, where the message comprises at least a short training field and a long training field received from a first station, and a control module including control logic and one or more processors. The control logic and the one or more processors may include logic configured to detect a transition from the short training field to the long training field, logic configured to determine a first arrival correction time based at least in part on the transition from the short training field to the long training field, and logic configured to determining a position of the device in accordance with the first arrival correction time.

In yet another embodiment, an apparatus may include means for receiving a message at the apparatus, where the message comprises at least a short training field and a long training field received from a first station, means for detecting a transition from the short training field to the long training field, means for determining a first arrival correction time based at least in part on the transition from the short training field to the long training field, and means for determining a position of the apparatus in accordance with the first arrival correction time.

Figure 7:
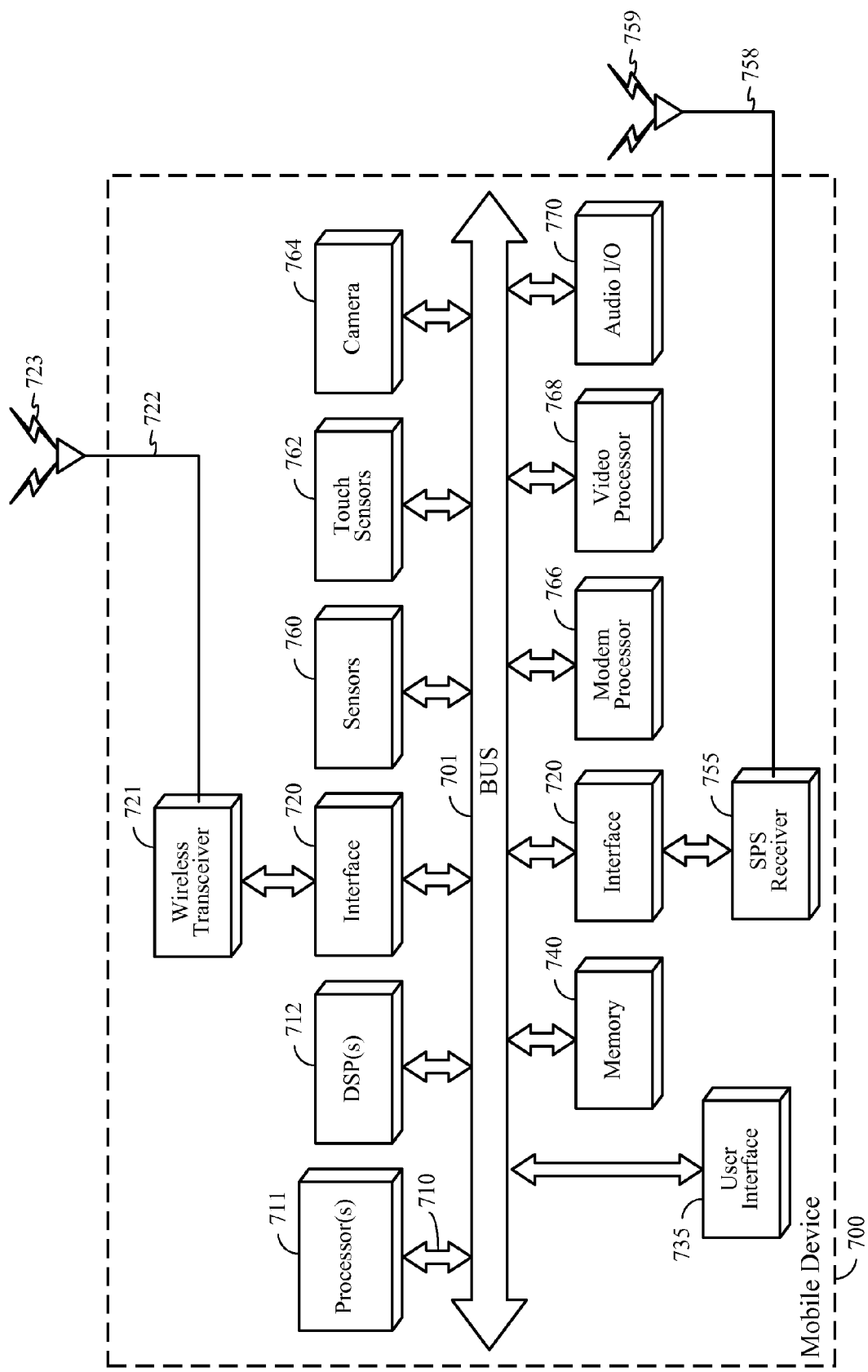
FIG. 7 illustrates an exemplary block diagram of a device according to aspects of the present disclosure.

FIG. 7 illustrates an exemplary block diagram of a device according to aspects of the present disclosure. As shown in FIG. 7, mobile device 100 (FIG. 1) may comprise one or more features of mobile device 700 shown in FIG. 7. In certain embodiments, mobile device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

According to aspects of the present disclosure, wireless transceiver 721 may comprise a transmitter and a receiver. The transmitter and the receiver may be implemented to share common circuitry, or may be implemented as separate circuits. Depending on particular situations of communications between sending STA 202 and receiving station 204 of FIG. 2, the wireless transceiver in the sending STA 202 or the receiving STA 204 may function as either the transmitter or the receiver, or vice versa. For example, to send a message from sending STA 202 to receiving STA 204, the wireless transceiver of sending STA 202 acts as a transmitter, and the wireless transceiver of receiving STA 204 acts as a receiver. On the other hand, to send an acknowledgement indicating the above message has been received the wireless transceiver of receiving STA 204 acts as a transmitter, and the wireless transceiver of sending STA 202 acts as a receiver.

Mobile device 700 may also comprise SPS receiver 755 capable of receiving and acquiring SPS signals 759 via SPS antenna 758. SPS receiver 755 may also process, in whole or in part, acquired SPS signals 759 for estimating a location of mobile device 100. In some embodiments, processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals for use in performing positioning operations may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless STA as discussed above. Processor(s) 711 and/or DSP(s) 712 may execute instructions to execute one or more aspects of processes/methods discussed above in connection with FIG. 5A-5D and FIG. 6A-6D.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8:
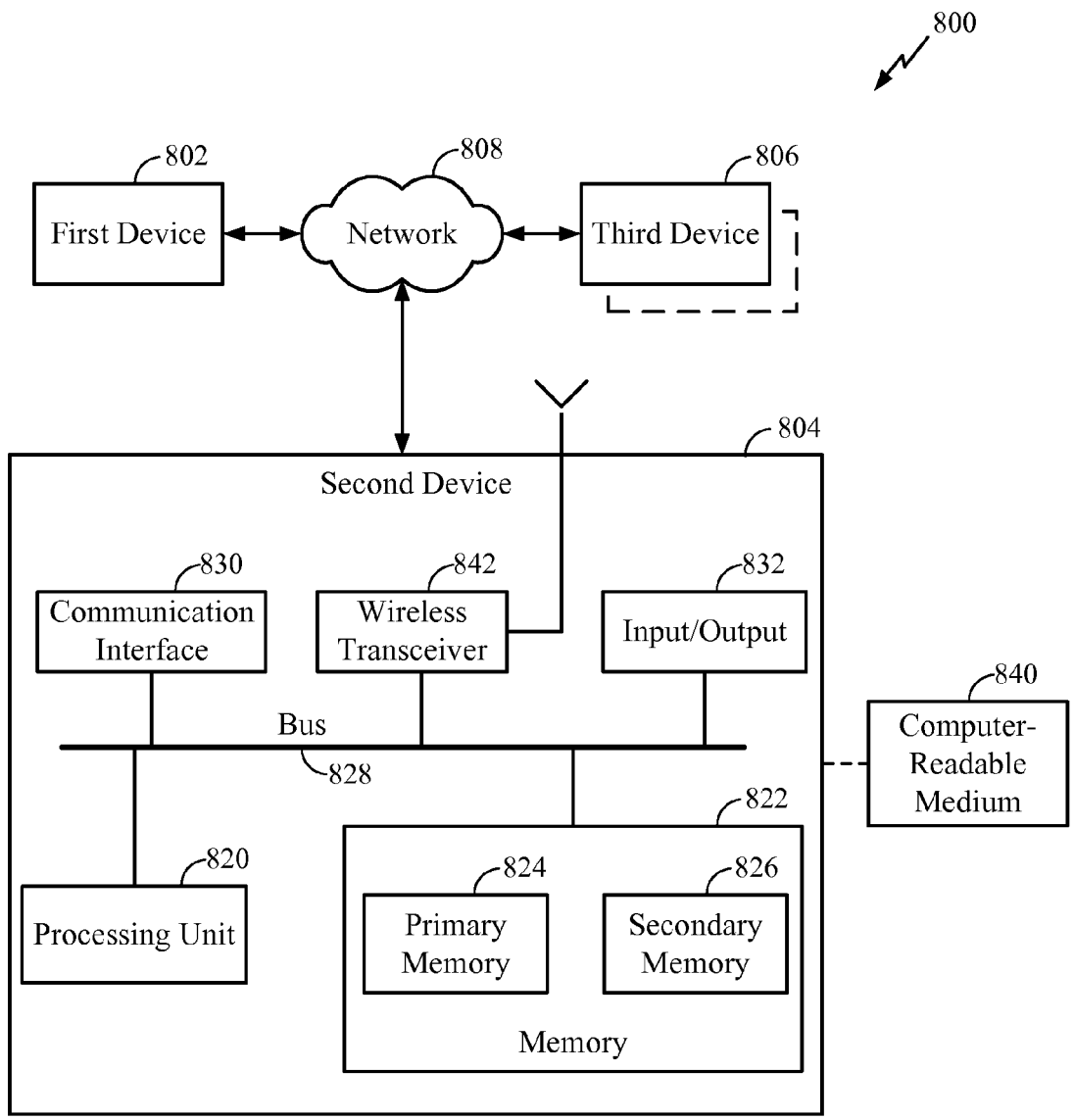
FIG. 8 illustrates an exemplary block diagram of a computing platform according to aspects of the present disclosure.

FIG. 8 illustrates an exemplary block diagram of a computing platform according to aspects of the present disclosure. In this example, system 800 may include one or more devices configurable to implement techniques or processes described above, for example, in connection with FIG. 1. System 800 may include, for example, first device 802, second device 804, and third device 806, which may be operatively coupled together through a wireless communications network 808. In an aspect, first device 802 may comprise a server capable of providing positioning assistance data such as, for example, a base station almanac. Second and third devices 804 and 806 may comprise mobile devices, in an aspect. Also, in an aspect, wireless communications network 808 may comprise one or more wireless access points, for example.

First device 802, second device 804 and third device 806, as shown in FIG. 8, may be representative of any device, appliance or machine (e.g., such as local transceiver 108 or servers 140, 150 or 160 as shown in FIG. 1) that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a service access transceiver device capable of facilitating wireless service to a mobile device such as a WLAN access point or femto cell as part of a wireless communication service provider/system; or any combination thereof. Any of the first, second, and third devices 802, 804, and 806, respectively, may comprise one or more of a base station almanac server, a base station, or a mobile device in accordance with the examples described herein.

Similarly, wireless communications network 808 (e.g., in a particular of implementation of network 130 shown in FIG. 1), may be representative of one or more communication links, processes, or resources configurable to support the exchange of data between at least two of first device 802, second device 804, and third device 806. By way of example but not limitation, communications network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to wireless communications network 808.

It is recognized that all or part of the various devices and networks shown in system 800, and the processes and methods as further described herein, may be implemented using or otherwise including hardware, firmware, software, or any combination thereof. Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof. Wireless transceiver 842 may communicate with processing unit 820 through bus 828 to enable second device 804 to be configured as a wireless STA as discussed above. Processing unit 820 may execute instructions to execute one or more aspects of processes/methods discussed above in connection with FIG. 5A-5D and FIG. 6A-6D.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 1030 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

Note that the paragraphs herein, FIG. 1, FIG. 5A-5D, FIG. 7, FIG. 8 and their corresponding descriptions provide means for receiving a message at the apparatus, means for detecting a transition from the short training field to the long training field, means for determining a first arrival correction time based at least in part on the transition from the short training field to the long training field, means for assisting the second station to determine a range of the second station in accordance with the first arrival correction time, means for monitoring a window of impulse responses of the message received, means for generating a normalized energy level of the window of impulse responses with respect to time using the message received, means for identifying the transition from the short training field to the long training field based at least in part on the normalized energy level exceeds a predetermined threshold, means for determining a first arrival time using the transition from the short training field to the long training field, means for determining the first arrival correction time according to a difference between the first arrival time and an expected arrival time, means for transmitting a first message to the second station, and means for transmitting a second message to the second station.

Note that the paragraphs herein, FIG. 1, FIG. 6A-6D, FIG. 7, FIG. 8 and their corresponding descriptions provide means for receiving a message at the apparatus, means for detecting a transition from the short training field to the long training field, means for determining a first arrival correction time based at least in part on the transition from the short training field to the long training field, means for determining a position of the apparatus in accordance with the first arrival correction time, means for monitoring a window of impulse responses of the message received, means for generating a normalized energy level of the window of impulse responses with respect to time using the message received, means for identifying the transition from the short training field to the long training field based at least in part on the normalized energy level exceeds a predetermined threshold, means for determining a first arrival time using the transition from the short training field to the long training field, means for determining the first arrival correction time according to a difference between the first arrival time and an expected arrival time, means for receiving a first message from the first station, means for computing an adjusted time of reception of the first message from the first station using the first arrival correction time, means for determining the position of the apparatus based at least in part on the adjusted time of reception of the first message, means for receiving a second message from the first station, and means for determining the position of the apparatus based at least in part on the adjusted time of reception of the first message and the adjusted time stamp from the first station.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method of determining a range between two stations, comprising:
   receiving a message at a first station, wherein the message comprises at least a short training field and a long training field received from a second station;
   detecting a transition from the short training field to the long training field, comprising monitoring a window of impulse responses of the message received, generating a normalized energy level of the window of impulse responses with respect to time using the message received, and identifying the transition from the short training field to the long training field based, at least in part, on:
   a slope of the normalized energy level exceeding a predetermined threshold of the slope of the normalized energy level;
   determining a first arrival correction time based at least in part on the transition from the short training field to the long training field; and
   assisting the second station to determine a range of the second station in accordance with the first arrival correction time.

2. The method of claim 1, wherein the predetermined threshold represents a fraction of the normalized energy level of the window of impulse responses.

3. The method of claim 1, wherein the determining the first arrival correction time comprises:
   determining a first arrival time using the transition from the short training field to the long training field; and
   determining the first arrival correction time according to a difference between the first arrival time and an expected arrival time.

4. The method of claim 1, wherein the assisting the second station to determine the range of the second station in accordance with the first arrival correction time comprises:
   transmitting a first message to the second station, wherein the first message is used to compute an adjusted time of reception of the first message from the first station using the first arrival correction time and to determine the range of the second station based at least in part on the adjusted time of reception of the first message.

5. The method of claim 4, wherein the assisting the second station to determine the range of the second station in accordance with the first arrival correction time further comprises:
   transmitting a second message to the second station, wherein the second message includes an adjusted time stamp from the first station, and wherein the adjusted time stamp from the first station is used to determine the range of the second station.

6. The method of claim 5, wherein the adjusted time stamp from the first station comprises:
   a time of reception of acknowledgement from the second station plus the first arrival correction time.

7. The method of claim 5, wherein the adjusted time stamp from the first station further comprises:
   a time of reception of acknowledgement from the second station plus the first arrival correction time and a random noise.

8. A computer program product comprising a non-transitory medium storing instructions for execution by one or more computer systems, the instructions comprising:
   instructions for receiving a message at a first station, wherein the message comprises at least a short training field and a long training field received from a second station;
   instructions for detecting a transition from the short training field to the long training field, comprising instructions for monitoring a window of impulse responses of the message received, instructions for generating a normalized energy level of the window of impulse responses with respect to time using the message received, and instructions for identifying the transition from the short training field to the long training field based, at least in part, on:
   a slope of the normalized energy level exceeding a predetermined threshold of the slope of the normalized energy level;
   instructions for determining a first arrival correction time based at least in part on the transition from the short training field to the long training field; and
   instructions for assisting the second station to determine a range of the second station in accordance with the first arrival correction time.

9. The computer program product of claim 8, wherein the predetermined threshold represents a fraction of the normalized energy level of the window of impulse responses.

10. The computer program product of claim 8, wherein the instructions for determining the first arrival correction time comprises:
    instructions for determining a first arrival time using the transition from the short training field to the long training field; and
    instructions for determining the first arrival correction time according to a difference between the first arrival time and an expected arrival time.

11. The computer program product of claim 8, wherein the instructions for assisting the second station to determine the range of the second station in accordance with the first arrival correction time comprises:
    instructions for transmitting a first message to the second station, wherein the first message is used to compute an adjusted time of reception of the first message from the first station using the first arrival correction time and to determine the range of the second station based at least in part on the adjusted time of reception of the first message.

12. The computer program product of claim 11, wherein the instructions for assisting the second station to determine the range of the second station in accordance with the first arrival correction time further comprises:

instructions for transmitting a second message to the second station, wherein the second message includes an adjusted time stamp from the first station, and wherein the adjusted time stamp from the first station is used to determine the range of the second station.

13. The computer program product of claim 12, wherein the adjusted time stamp from the first station comprises:
a time of reception of acknowledgement from the second station plus the first arrival correction time.

14. The computer program product of claim 12, wherein the adjusted time stamp from the first station further comprises:
a time of reception of acknowledgement from the second station plus the first arrival correction time and a random noise.

15. A device, comprising:
a transceiver configured to receive a message at the device, wherein the message comprises at least a short training field and a long training field received from a second station;
one or more processors or digital signal processors or combination thereof configured to
detect a transition from the short training field to the long training field, comprising monitor a window of impulse responses of the message received, generate a normalized energy level of the window of impulse responses with respect to time using the message received, and identify the transition from the short training field to the long training field based, at least in part, on:
a slope of the normalized energy level exceeding a predetermined threshold of the slope of the normalized energy level;
determine a first arrival correction time based at least in part on the transition from the short training field to the long training field; and
assist the second station to determine a range of the second station in accordance with the first arrival correction time.

16. The device of claim 15, wherein the one or more processors or digital signal processors or combination thereof configured to determine the first arrival correction time are further configured to:
determine a first arrival time using the transition from the short training field to the long training field; and
determine the first arrival correction time according to a difference between the first arrival time and an expected arrival time.

17. The device of claim 15, wherein the one or more processors or digital signal processors or combination thereof configured to assist the second station to determine the range of the second station in accordance with the first arrival correction time are further configured to:
transmit a first message to the second station, wherein the first message is used to compute an adjusted time of reception of the first message from the device using the first arrival correction time and to determine the range of the second station based at least in part on the adjusted time of reception of the first message.

18. The device of claim 17, wherein the one or more processors or digital signal processors or combination thereof configured to assist the second station to determine the range of the second station in accordance with the first arrival correction time further are further configured to:
transmit a second message to the second station, wherein the second message includes an adjusted time stamp from the device, and wherein the adjusted time stamp from the device is used to determine the range of the second station.

19. The device of claim 18, wherein the adjusted time stamp from the device comprises:
a time of reception of acknowledgement from the second station plus the first arrival correction time.

20. The device of claim 18, wherein the adjusted time stamp from the device further comprises:
a time of reception of acknowledgement from the second station plus the first arrival correction time and a random noise.

21. An apparatus, comprising:
means for receiving a message at the apparatus, wherein the message comprises at least a short training field and a long training field received from a second station;
means for detecting a transition from the short training field to the long training field, comprising means for monitoring a window of impulse responses of the message received, means for generating a normalized energy level of the window of impulse responses with respect to time using the message received, and means for identifying the transition from the short training field to the long training field based, at least in part, on:
a slope of the normalized energy level exceeding a predetermined threshold of the slope of the normalized energy level;
means for determining a first arrival correction time based at least in part on the transition from the short training field to the long training field; and
means for assisting the second station to determine a range of the second station in accordance with the first arrival correction time.

22. The apparatus of claim 21, wherein the means for determining the first arrival correction time comprises:
means for determining a first arrival time using the transition from the short training field to the long training field; and
means for determining the first arrival correction time according to a difference between the first arrival time and an expected arrival time.

23. The apparatus of claim 21, wherein the means for assisting the second station to determine the range of the second station in accordance with the first arrival correction time comprises:
means for transmitting a first message to the second station, wherein the first message is used to compute an adjusted time of reception of the first message from the apparatus using the first arrival correction time and to determine the range of the second station based at least in part on the adjusted time of reception of the first message.

24. The apparatus of claim 23, wherein the means for assisting the second station to determine the range of the second station in accordance with the first arrival correction time further comprises:
means for transmitting a second message to the second station, wherein the second message includes an adjusted time stamp from the apparatus, and wherein the adjusted time stamp from the apparatus is used to determine the range of the second station.

25. The apparatus of claim 24, wherein the adjusted time stamp from the apparatus comprises:
a time of reception of acknowledgement from the second station plus the first arrival correction time.

26. The apparatus of claim 24, wherein the adjusted time stamp from the apparatus further comprises:
   a time of reception of acknowledgement from the second station plus the first arrival correction time and a random noise.

* * * * *